United States Patent

[11] 3,620,754

[72] Inventors  Tsunetoshi Kanemitsu;
              Yukio Asakura, both of Tokyo, Japan
[21] Appl. No. 803,444
[22] Filed      Feb. 28, 1969
[45] Patented   Nov. 16, 1971
[73] Assignee   Taiyo Fishery Co. Ltd.
                Tokyo, Japan
[32] Priority   Feb. 29, 1968
[33]            Japan
[31]            43/1257

[54] PROCESS FOR PREPARING A WATER-CONTAINING FEED FOR CULTIVATING MACRURA AND PRODUCT
4 Claims, No Drawings

[52] U.S. Cl. .................................................. 99/3, 99/2
                            AB, 99/2 CD, 99/2 E, 99/2 V
[51] Int. Cl. ............................................. A01k 85/02
[50] Field of Search .................................... 99/1, 3, 7,
              2, 6, 2 V, 2 CD, 2 E, 2 AB, 14, 11, 2 F; 119/1;
                                         43/41, 42, 55, 56

[56]              References Cited
           UNITED STATES PATENTS
2,555,088   5/1951   Irwin ............................  43/41
2,825,648   3/1958   Corbett .........................  99/3
2,904,436   9/1959   Auerback .......................  99/3
3,361,566   1/1968   Axelrod .........................  99/3
3,428,459   2/1969   Hinds ...........................  99/3
           FOREIGN PATENTS
497,847   11/1953   Canada ..........................  99/3
           OTHER REFERENCES
Fearnow " Good Fish Care etc." Food, U.S. Dept of Commerce Fishery Doc. #935 (1922) pages 5– 7 99/3
" Feeds and Feeding" by Morrison (1957) pages 524, thru 527 incl. copy 99/3 library

*Primary Examiner*—Norman Yudkoff
*Assistant Examiner*—F. E. Drummond
*Attorneys*—Ralph E. Bucknam, Jesse D. Reingold, Robert R. Strack and Henry A. Marzullo, Jr.

ABSTRACT: This invention discloses a novel composition and the process by which a feed having excellent properties particularly for use in feeding macrura cultivated in nursery is prepared by kneading a mixture of from 40 to 75 percent of a compound fish feed, 15 to 30 percent of starch and 10 to 30 percent of a heat-coagulating protein, adding, before or during kneading, water in the quantity adequate to obtain a final product having a water content of from 50 to 70 percent, and heating the water-containing mixture until it coagulates.

3,620,754

PROCESS FOR PREPARING A WATER-CONTAINING FEED FOR CULTIVATING MACRURA AND PRODUCT

BACKGROUND OF THE INVENTION

1. Field of the Invention

The present invention relates to a composition and the process by which a water-containing feed having excellent properties for use in feeding macrura, such as prawn, shrimp, lobster, etc., cultivated in a nursery is prepared by simple processing of commercially available compound fish feed. The feed of the invention is formed by kneading a mixture of from 40 to 75 percent by weight of a compound fish feed, from 15 to 30 weight percent of starch and from 10 to 30 weight percent of heat-coagulating protein, to which water is added before or during kneading, in a quantity adequate to provide the final product with a water content of from 50 to 70 percent by weight, based on the total weight of the final product. After kneading the product is heated until it coagulates, thus forming a water-containing feed excellent for use in feeding macrura cultivated in a nursery.

2. Description of the Prior Art

Because the cultivation of macrura is a recently developed industry, there is no specific feed for the macrura and therefore the conventional compound fish feeds have been used, usually in pellets or as mash. A pellet feed is produced by mixing a powdered compound fish feed with starch, etc. without adding water or with a slight quantity of water, and pelletizing the material by pellet machine. A mash feed is prepared by kneading the aforesaid mixture ($\alpha$ type starch is used) while adding water in substantially the same amount as that of the mixture. While a pellet feed is better in preservation and ease of feeding, it does not hold together in water; in other words it is poor in collapse resistance. The collapse resistance can be improved by adding a proper bonding agent, but the bonding agent will impair the digestibility of the feed. A mash feed can be prepared at relatively low cost, but it is readily collapsed and the nutrients are apt to leach out into the water after feeding. Mash feed is also unpalatable to the macrura.

SUMMARY OF THE INVENTION

An object of this invention is firstly to provide a water-containing feed for macrura cultivating at lower cost, rich in nutrients, resistant to nutrient loss by leaching, highly palatable and digestable, and also resistant to collapse in water.

An object of this invention is secondly to provide a water-containing feed for macrura, the residue or leftovers of which, after feeding by macrura, spontaneously comes afloat on the surface of water.

An object of this invention is thirdly to provide a water-containing feed for macrura that is fairly good in the preservation in spite of its high water content of from 50 to 70 percent.

The present invention provides an improved process by which an excellent water-containing feed for macrura is produced by kneading a mixture of from 40 to 75 weight percent of a compound fish feed, from 15 to 30 weight percent of starch, and from 10 to 30 weight percent of a heat-coagulating protein, adding, before or during kneading, water in an amount adequate to provide a final product with a water content from 50 to 70 percent by weight and heating the final product until it coagulates. After cooling, the product is cut into cubes ranging from 3 to 10 millimeters square. By this process, an excellent water-containing feed for macrura cultivating can be produced by simple processing of a commercially available compound fish feed. The feed of the invention thus obtained had good collapse resistance, excellent palatability, digestibility, is rich in nutrients, less in the nutrient loss in the water, the leftovers spontaneously come afloat on the water surface, and also has good preservability.

DESCRIPTION OF THE PREFERRED EMBODIMENTS

A macrura sheds its shell many times in the process of its growth, and this makes the macrura need much more food than other fish. Therefore low cost is one of the most important factors of feed for macrura cultivating. A macrura hides in the sand during the daytime and feeds from sunset through the night. Feeding takes rather a long time, sometimes as long as hours, because the macrura holds food by its feet and bites little by little from one end. Therefore if the feed collapses in the water and its nutrient leaches out while the macrura is eating it, the feed is lost to that extent. Furthermore, the sediment of the collapsed feed and leftovers accumulates on the sand bed of the nursery to form a deoxidizing layer that causes suffocation of the macrura, which is prone to hide in the sand. Digestibility is also an important factor for feed. If indigestible food is given to macrura, the undigested excrement of the macrura accumulates on the sand bed and as the organic substances decompose a deoxidizing layer is formed causing a destructive effect in macrura cultivating.

The compound fish feed which can be used in the process of this invention can be found in the commercial compound fish feed available from market. This compound fish feed is a powdered mix usually composed of an ordinary fish meal and a vitamin-mineral mix. A portion of the fish meal may sometimes be substituted by a fish soluble. In such a case it is less than 10 percent. The vitamin-mineral mix included in the compound fish feed usually lies within a range of from 3 to 8 weight percent, preferably from 4 to 6 weight percent. The starch used in this invention can be from potato, sweet potato, wheat flour, maize flour, tapioca, etc. When mixed with the fish feed, the starch is usually used in $\beta$ type. Of course, $\alpha$ type starch may be used and starch may partly be substituted with CMC (carboxymethyl cellulose). The heat-coagulating protein used in this invention is protein which shows a bonding property when heated in the presence of water. The heat-coagulating protein is substantially a pure protein. Accordingly, on using the substance containing said protein, it is necessary to use the substance in a quantity adequate to give, for example, from 10 to 30 percent of pure protein. Vegetable protein such as soya bean protein, wheat flour protein, etc., are known to be used as heat-coagulating protein available at lower cost, while animal protein such as livestock meat protein, fish meat protein, etc., also can be used for the purpose. In case of animal protein, it can be used in the form of fish paste and minced meat. Further, the aforesaid vegetable and animal protein can be used separately or in admixture. In the case of the commercial compound fish feed, it may be used with more effect if ascorbic acid ester and/or a small quantity of common salt is added. For heating means used in this invention, steaming and cooking are preferable.

As the result of various experiments made to find out the relationship between the water content of the feed and the growing rate of macrura, the present inventors have discovered that a close relation exists between the water content of the feed and the growth of macrura. In fish in general, there is seen a trend that when the water content of the feed is too low, the digestibility of the feed by the fish is lost, and this trend is found particularly conspicuous in macrura. The macrura fed on the feed less than 50 percent in water content were found to stop their growth suddenly. From this, it has been found that the water content of the feed for cultivating should be higher than 50 percent. However, the water content of the feed cannot be increased without limit because of the collapse or the loss of the collapse resistance of the feed in the water. Fish meat prepared as a hard paste like a sausage may be good having a high water content, but this is economically impracticable because of high cost of material and an elaborate processing. The process using a compound fish feed instead of raw fish meat and a larger quantity of starch as a bonding agent may be lower in raw material cost, but this feed is not recommended because of poor nutrient value. In result of further study made by the present inventors, they discovered that when an appropriate quantity of a heat-coagulating protein is used in addition to starch as a binding agent the product feed did not collapse in the water even after its water content reached 70 percent, showing a good collapse resistance. If water content of the feed exceeds 70 percent, the feed collapses before macrura finishes eating and therefore such feed cannot be available for macrura cultivating.

Another outstanding advantage of this feed prepared under this invention is that the feed once sunk to the bottom of the nursery will, in 1 or 2 days, come afloat on the surface of water spontaneously. The residuals of the feed afloat on the surface are removed by flowing water so that only fresh feed always remain on the nursery bed eliminating the risk of formation of deoxidizing layer destructive to macrura cultivating. The feed residual afloat on the surface of the water will offer a good sign for the farmer to see the feeding going in good order or not and help him to continue a proper feeding. The feed prepared by this invention process can be kept for a long time in cold storage. Some loss in bonding property is seen in the feed kept in the cold storage, but the feed prepared by this process will not show loss of collapse resistance. If the feed was made by adding some antiseptics, for example, sorbinic acid in the order of 1/1,000 of the high water content feed and/or α—Furyl—β— (5 nitro—2—furyl)—acrylic acid amide about 20 p.p.m., and by heating in casing, such feed can be stored under the room temperature for more than one month. Table 1 shows the relative results of the prawn cultivating experiments using various types of feed including the feed disclosed by this invention. The feed for prawn cultivating used in these experiments has the ingredients as shown in the following formula.

Hereinafter called Feed Type A:
Fishmeal 47 wt. parts,
Fish soluble 5 wt. parts,
Vitamin-mineral mix 3 wt. parts,
Starch 15 wt. parts,
Soybean protein 30 wt. parts, 100

Note: Vitamin-mineral mix is a mixture consisting of various types of crystallized vitamin used in the test feed described in the article by J. E. Halver published in Journal of Nutrition, 1957, 62, 225, and mixed mineral (in this invention process, calcium carbonate is used instead of u.s.p. XII salt mixture No.2).

The "mineral feed" comprises sodium chloride or calcium carbonate as a major ingredient, and zinc sulfate, cobaltous chloride, manganous sulfate, etc. In general, 1–2 parts of the crystalline vitamin supplement is added to 100 parts of mineral feed. The particular vitamin-mineral mix used in Feed A and examples 1–5 is as follows:

| Mineral Mixture | Amount |
| --- | --- |
| Calcium Carbonate | 100 g. |
| Aluminum Chloride | 18 mg. |
| Zinc Sulfate | 357 mg. |
| Cuprous Chloride | 11 mg. |
| Manganous Sulfate | 80 mg. |
| Potassium Iodide | 17 mg. |
| Cobaltous Chloride | 105 mg. |
| | 100.588 g. |

| Crystaline Vitamin Supplement | Amount (mg.) |
| --- | --- |
| Thiamine-hydrochloride | 6 |
| Riboflavin | 20 |
| Pyridoxine Hydrochloride | 4 |
| Nicotinic acid | 80 |
| Calcium pantothenate | 28 |
| Inositol | 400 |
| Biotin | 0.6 |
| Folic acid | 1.5 |
| p-Aminobenzoic acid | 40 |
| Choline chloride | 800 |
| Ascorbic acid | 200 |
| Alpha-tocopherol | 40 |
| Menadione | 4 |
| Beta-carotene | 1.2 |
| Activated 7-dehydrocholesterol | 0.0045 |
| Crystalline vitamin $B_{12}$ | 0.009 |
| | 1,625.3135 mg. |

The following four types of feed for feeding prawn were prepared:

1. Pellet Type

This feed was prepared from Feed Type A by using a pellet machine. But, β type starch was used. Feed Type A is 8 percent in water content.

2. Mash Type

This feed was prepared by kneading Feed Type A with about an equal quantity of water. α type starch was used. This feed is 55 percent in water content.

3. The Present Invention Type

This feed was prepared by kneading Feed Type A with water about 130 percent in quantity and then by heating it for 30 minutes in steam. β type starch was used.

4. Natural Feed

Defrozen Akaebi (a kind of shrimps) was used as a natural feed for the purpose of control to be compared with the aforesaid pellet-type, mash-type and the invention-type feeds.

Experiments were made in four farms, each using different feeds, namely pellet type, mash type, invention type, and natural feed, on the group of 60 prawns each. Daily ration of the feed was 2 weight percent of the weight of the prawn in dry feed. Feed was given once a day.

TABLE 1.—RESULTS OF EXPERIMENTS MADE ON PRAWN FARMING

| | Type of feed | | | |
| --- | --- | --- | --- | --- |
| | Defrozen Akaebi | Heating type (Invention) | Pellet type | Mash type |
| On starting experiment: | | | | |
| Number of prawns in the farm | 60 | 60 | 60 | 60 |
| Weight of prawns, g | 300 | 300 | 304 | 302 |
| Feed given, g./day | 60 | 14 | 10 | 14 |
| On the 30th day: | | | | |
| Number of surviving prawns | 60 | 60 | 58 | 26 |
| Total weight, g | 480 | 488 | 400 | 172 |
| Average weight of prawn, g | 8.0 | 8.1 | 6.9 | 6.6 |
| Increase of average weight of prawn, g | 3.0 | 3.1 | 1.8 | 1.6 |
| On the 60th day: | | | | |
| Number of surviving prawns | 58 | 57 | 43 | 12 |
| Total weight, g | 632 | 604 | 357 | 85 |
| Average weight of prawn, g | 10.9 | 10.6 | 8.3 | 7.1 |
| Increase of average weight of prawn, g | 2.9 | 2.5 | 1.4 | 0.5 |
| On the 90th day: | | | | |
| Number of surviving prawns | 57 | 56 | 32 | (1) |
| Total weight, g | 775 | 756 | 294 | (1) |
| Average weight of prawn, g | 13.6 | 13.5 | 9.2 | (1) |
| Increase of average weight of prawn, g | 2.7 | 2.9 | 0.9 | (1) |
| Retention of water-soluble ingredient, percent | | 75 | 40 | 5 |
| Collapse resistance, percent | | 95 | 80 | 30 |

1 Discontinuance.

Retention of water-soluble ingredient in the above table is the value found by measuring the quantity of riboflavin leached out into the water. Feed Type A is added riboflavin and made into pellet type, mash type, and this invention type (heat type) respectively and they were placed in water for 3 hours while giving a mild agitation. Then the quantity of riboflavin leached out into the water was measured by a electrophotocolorimeter. And, the collapse resistance is found by measuring the amount of decrease of solid after the three types of feed, pellet, mash, and the invention, were kept in water for 3 hours while giving a mild agitation.

The high water content feed for cultivating macrura prepared by the process as disclosed by this invention has the excellent characteristics, such as low production cost, good collapse resistance in water, and less nutrient loss by leaching as well as good liking by macrura and high digestibility. Further advantage of this feed is that the residual of the feed does not remain long on the sand bed but spontaneously floats on the water surface and is removed by flowing water. And the farmer seeing the amount of residual feed afloat on the surface can regulate the quantity of feed to be given to prawns and also the nursery bed is always maintained free from foulness.

In the following, some examples of this invention will be described but these should by no means be understood to define the scope of this invention.

EXAMPLE 1

First, a compound feed was made by mixing fishmeal from the morthern sea fishery 47 wt. pts., fish soluble from the northern sea fishery 5 wt. pts., vitamin-mineral mix 3 wt. pts., ascorbic acid ester 0.05 wt. pts. with potato starch 15 wt. pts. and soyabean starch 30 wt. pts. (62 percent in heat-coagulating protein, residual starch) added thereto. After kneading this compound fish feed 100 parts adding water as much as 1.3 times in quantity into a paste, this paste is heated by steam in a steaming basket for 30 minutes to obtain a product 62 percent in water content. After cooling, the product feed was cut into dices, 5 mm. square each and given to 60 prawns weighing in total 345 grams. After 90 days' feeding, the prawns were found to number 58 grown to weigh-in total 904 grams. After the experiment, no deoxidizing layer was observed on sand bed. Feed was given until prawns were sated with it, regulating, however, quantity of feed according residual feed afloat on the surface, and the residuals afloat were removed.

EXAMPLE 2

A compound feed was prepared by mixing the northern sea fishery fishmeal 50 wt. pts., a conventional fish-soluble 5 wt. pts., vitamin-mineral mix 3 wt. pts., ascorbic acid ester 0.05 wt. pts., wheat flour starch 25 wt. pts., wheat flour protein (heat coagulating) 15 wt. pts., and CMC 2 wt. pts. This compound feed was added with equal quantity of water and processed in the same way as described in example 1 and thereby obtained a product 55 percent in water content. After cooling, this product was cut into dices 5 mm. square each and was given to 60 prawns weighing in total 320 grams. After 90 days' feeding, the prawns were found to number 59 grown up to weigh in total 895 grams. Like in example 1, no deoxidizing layer was found.

EXAMPLE 3

A compound feed was prepared by mixing fishmeal 52 wt. pts., vitamin-mineral mix 3 wt. pts., wheat flour starch 15 wt. pts., soyabean protein 15 wt. pts. (62 percent in heat-coagulating protein content, residual starch) fish meat paste (18 percent protein, 80 percent water) 18 wt. pts., common salt 2 wt. pts. After kneading this compound feed adding water in 80 wt. pts., the paste obtained was heat-processed in the same way as described in example 1. After cooling, the product feed was cut into dices, 5 mm. square each, before feeding. This feed was of chemical composition, protein 22 percent, ash content 5 percent, fat 1 percent, and water 63 percent. After feeding 60 prawns weighing in total 400 g. with this feed for 90 days, the result obtained was 59 prawns weighing in total 1,200 grams. After the experiment was completed, no deoxidizing layer was found on the nursery bed.

EXAMPLE 4

The feed same as the one described in example 3 was cut into smaller dices, 3 mm. square each, and was given to prawn fry weighing in total 50 grams, each fry weighing 0.05 grams, and feeding was continued for 120 days. After 120 days' feeding, the fry was found to have grown up to average 15 grams each, weighing in total 395 grams. No deoxidizing layer was found on the nursery bed after the completion of the experiment.

EXAMPLE 5

A compound feed was prepared by mixing fish meal 62 wt. pts., fish-soluble 5 wt. pts., vitamin-mineral mix 3 wt. pts., and wheat flour starch 30 wt. pts. To 100 wt. pts. of this compound feed was added 100 wt. pts. of minced codfish meat (common salt 2 percent, water 81 percent, and heat-coagulating protein 17 percent). After kneading the mixture with 100 wt. pts. of water, the paste obtained was heated in steam for about 30 minutes. The product obtained was found to contain 63 percent water, 37 percent in solid content, 27 percent in starch content in the solid, and 15 percent in heat-coagulating protein content. This product was cut into fine shreds and given to 100 prawn fry, weighing in total 3.23 grams. Result of 90 days' feeding was 75 prawns grown up to weigh in total 453 grams. No deoxidizing layer was found on the nursery bed.

What is claimed is:

1. A process for preparing a water-containing feed product for cultivating macrura, which macrura comprises shrimp, prawn and lobster, which hides at the bottom of the nursery in the sand thereof and which eats food slowly, which feed is resistant to collapse in water and capable of remaining at the bottom of the nursery for 1 or 2 days, which comprises kneading a powdered mixture of (1) from 40 percent to 75 percent of a fish feed composed of fishmeal and a vitamin-mineral mix, the latter in the proportion between 3 percent and 8 percent by weight of said feed product and which mineral mix comprises as a major constituent sodium chloride or calcium carbonate, and as a major constituent sodium chloride or calcium carbonate, and as major vitamin constituents choline chloride, acid and inositol, (2) from 15 to 30 percent by weight of a constituent selected from the group consisting of starch or a mixture of starch and carboxymethyl cellulose, and (3) from 10 percent to 30 percent by weight of a heat-coagulating protein, which protein is a vegetable or an animal protein or a mixture thereof and which is a member selected from the group consisting of soya bean, wheat flour, live stock meat and fishmeal, adding water to the mixture during the kneading in a quantity adequate to obtain a final product having a water content of from 50 to 70 percent by weight based on the total weight of the final product, and thereafter steam-heating the water-containing feed product thus obtained until it coagulates.

2. The process according to claim 1 wherein said fish feed additionally comprises fish solubles in amount less than 10 percent by weight of said fish feed.

3. The process according to claim 1 wherein said fish feed is a pulverized mixture comprising fishmeal, fish solubles and a vitamin-mineral mix, said fishmeal being present in the proportion of 47–62 parts, the fish solubles 5 parts and the vitamin-mineral mix 3 parts in 100 parts by weight of the final composition.

4. A feed of 62 percent water content for cultivating macrura in a nursery, which macrura comprises shrimp, prawn and lobster, which hides at the bottom of the nursery in the sand thereof and which eats food slowly, which feed is resistant to collapse in water and is capable of remaining at the bottom of the nursery for 1 or 2 days, which comprises 100 parts by weight of a mixture which consists of 47 parts of fishmeal, 5 parts of fish solubles, 3 parts of a vitamin-mineral mix, 15 parts of soya bean and 30 parts of potato starch, said vitamin-mineral mix containing as major component calcium carbonate and as minor components aluminum chloride, zinc sulfate, cobaltous chloride and manganous sulfate, and as major vitamin constituents inositol, choline chloride and ascorbic acid and as minor vitamin constituents thiamine hydrochloride, nicotinic acid, calcium pantothenate, alpha-tocopherol and para-aminobenzoic acid, said mixture having been kneaded with 1.3 times its weight of water, and having been steamed whereby the protein is coagulated.

* * * * *